No. 675,697. Patented June 4, 1901.
W. F. WILLIAMS.
ELASTIC TIRE.
(Application filed Feb. 21, 1901.)
(No Model.) 2 Sheets—Sheet 1.
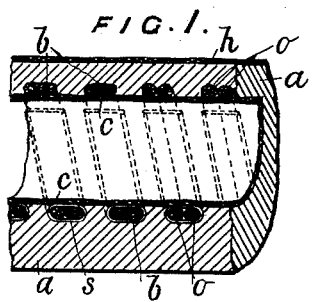
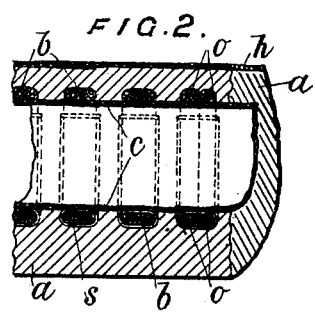
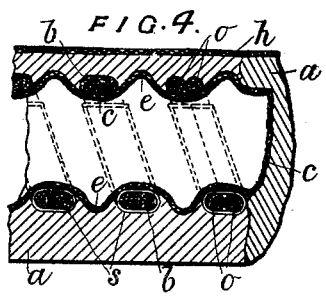
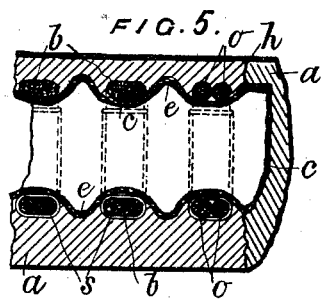
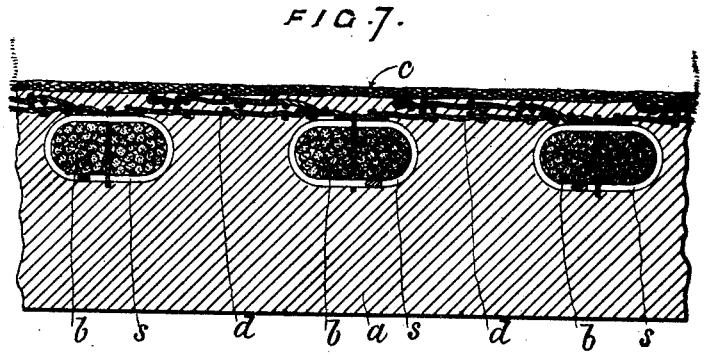
Witnesses:
Inventor
William F. Williams
By
Attorneys
THE NORRIS PETERS CO., PHOTO-LITHO., WASHINGTON, D. C.

No. 675,697. Patented June 4, 1901.
W. F. WILLIAMS.
ELASTIC TIRE.
(Application filed Feb. 21, 1901.)
(No Model.) 2 Sheets—Sheet 2.

Witnesses:
Paul Hunter
A. H. Davis

Inventor
William F. Williams
By Munn
Attorneys

UNITED STATES PATENT OFFICE.

WILLIAM FREDERICK WILLIAMS, OF LONDON, ENGLAND.

ELASTIC TIRE.

SPECIFICATION forming part of Letters Patent No. 675,697, dated June 4, 1901.

Application filed February 21, 1901. Serial No. 48,315. (No model.)

*To all whom it may concern:*

Be it known that I, WILLIAM FREDERICK WILLIAMS, gentleman, a subject of the King of Great Britain, residing at 17 and 18 Great Pulteney street, London, W., England, have invented new and useful Improvements in Elastic Tires, of which the following is a specification.

My invention relates to the manufacture of hollow rubber tires of D or approximately D section adapted to be secured to the wheel-rim by a band passing through the bore of the tire; and the invention has for its object to produce a rubber tire having embedded in the rubber (in immediate proximity to the bore of the tire) helical springs conforming to the transversely-arched form of the tire, in combination with a cord or cords adapted to form a core to fill up the interior of the springs, the springs and cords coacting to strengthen the tire.

Reference is to be had to the accompanying drawings, wherein—

Figure 3:
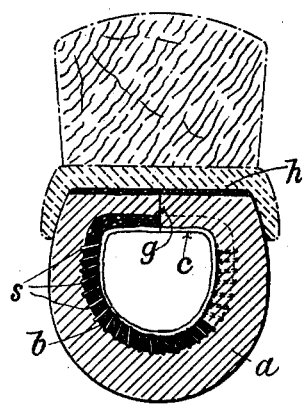
Figure 6:
Figure 8:
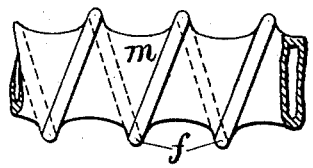
Figure 9:
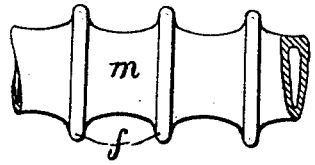

Figures 1 and 2 are part longitudinal sections of tires having helical springs embedded therein, the springs being upon a cord or cords, the cord in Fig. 1 being continuous and helically wound and in Fig. 2 consisting of separate circumferential convolutions of cord. Fig. 3 is a cross-section of the tire shown in Fig. 1. Figs. 4 and 5 are part longitudinal sections of tires like those shown in Figs. 1 and 3, respectively, but with grooves in the bore of the tire. Fig. 6 shows a portion of cord with spring threaded thereon and an attached reinforcing-strip of open-meshed fabric. Fig. 7 is a part longitudinal section, drawn to a larger scale, of a tire-head like that shown in Fig. 1, but provided with a reinforcing-strip, as in Fig. 6. Figs. 8 and 9 show the mandrels used in making the tires illustrated in Figs. 4 and 5, respectively.

The same letters of reference indicate like parts in all the figures.

*a* is the rubber tire of D or approximately D form, *b* the cord or cords, and *c* the usual canvas lining.

The invention consists, essentially, in threading helical springs *s* (preferably of flattened form in cross-section) upon a cord *b*, (or upon two or more juxtaposed cords, as at *o*,) adapted to fill up the interior of the springs, so as to form a solid flexible core therefor, the springs *s* being spaced at intervals upon a continuous cord or cords, as in Figs. 1 and 4, or threaded upon short lengths of cord whose ends project beyond those of the springs, as in Figs. 2 and 5, and then winding or lapping the cord or cords, with the springs thereon, tightly about a mandrel of the sectional form corresponding to the intended form of the bore of the tire and previously covered with rubber-coated canvas *c*, as usual, so that the springs, if straight, will be caused by the cords to conform to the shape of the mandrel and will be brought to the arched form in the transverse direction of the tire with the ends of the springs presented toward the base thereof and will be held in position on the mandrel while the rubber is applied, the cords alone extending across the base *p* of the tire and serving to strengthen the same at the sides and to form a durable or wear-resisting bed for the metal band by which the tire is clasped to the wheel-rim, as above mentioned.

The springs *s*, whether carried by a continuous cord *b* or cords *o*, wound helically, or each by a separate cord *b* or cords *o*, lapped circumferentially about the mandrel, are separated by intervals which are filled by the rubber deposited about the springs, which, together with the cords, are thus firmly embedded in the rubber.

In order to preserve the equal spacing of the springs upon the mandrel *m*, the latter may be formed with a continuous helical rib *f*, as shown in Fig. 8, or with separate circumferential ribs, as shown in Fig. 9, the cord or cords, with the springs threaded thereon, being wound or lapped around the mandrel in the groove or grooves *r* between the said rib or ribs, by which rib or ribs the additional purpose is served of molding in the rubber intervening between adjacent springs *s* grooves *e*, which extend helically, as in Fig. 4, or circumferentially, as in Fig. 5, around the walls of the bore and which have the effect of facilitating the longitudinal compression and flexure of the tire in applying it about the wheel-rim.

The springs s are of such length that when bent to the arched form by being lapped around the mandrel they extend around the arched portion of the mandrel from side to side, their ends being approximately flush with the flat side of the mandrel, and when a continuous cord or cords helically wound upon the mandrel is used the springs are so spaced on the cord or cords that the intervals between the springs correspond to those portions of the cord which cross the flat side of the mandrel, at which the base p of the tire is formed.

When the springs are threaded each on a separate length of cord or on juxtaposed lengths, the end portions of the cord or cords project beyond the ends of the springs and are of such length as to just meet at the middle of the flat side of the mandrel, where they are secured in position by being cemented to rubber-coated canvas, which is first wrapped about the mandrel to form the liner c for the bore of the tire. When the mandrel is ribbed, as shown in Figs. 8 and 9, the liner is pressed by the cord or cords into the grooves between the ribs, so that the liner is caused to conform to the helically or circularly ribbed configuration of the mandrel and to present a correspondingly grooved or corrugated surface at the bore of the tire.

If necessary, in order to permit the removal of the mandrel from the tire, the flat base p of the latter may be slit longitudinally along the center line, as at g in Fig. 3, the severed portions being reunited or not by cementing together the cut faces and by applying to the base of the tire a covering strip or strips of rubber-coated canvas h cemented on.

With the cords and springs (whether the former be continuous or in short lengths) there may be combined a reinforcing-strip d of open-meshed fabric, such as shown, such strip being woven with selvaged edges and being stitched to the cord after the springs have been applied thereon, so as to retain the springs in properly-spaced positions on the cord, prevent their being displaced in handling while winding or lapping around the mandrel, and insure a firmer union of the cords and springs to the rubber.

The reinforcing-strip is made of such width as to project at each side of the cord to such extent as to bridge over the interval between adjacent springs, the margins of adjacent reinforcing-strips overlapping and being, so to speak, "keyed" together by the rubber passing through the meshes of both.

The cord which I prefer to use is a plaited cord or several juxtaposed cords; but I wish it to be understood that under the term "cord" I include twisted cord or rope of any size and section suited to fill the springs.

I claim—

1. The combination with a hollow rubber wheel-tire of substantially D section, of spiral springs extending in arched form around the outer part of the bore of the tire with their ends presented toward the base of the tire, and of a fibrous cord or cords passing through the springs and extending across the flat base of the tire, the springs and cord or cords being embedded in the rubber at intervals with rubber intervening between the springs, substantially as specified.

2. The combination with a hollow rubber wheel-tire of substantially D section, of helical springs extending in arched form around the outer part of the bore with their ends presented toward the base or flat side thereof, and of a fibrous cord or cords passing through the springs and extending across the flat base of the tire, the springs and cord or cords being embedded in the rubber at intervals with rubber intervening between the springs, and of a canvas liner for the bore united to the cords and the intervening rubber.

3. The combination with a hollow rubber wheel-tire of substantially D section, of helical springs extending in arched form around the outer part of the bore with the ends presented toward the base or flat side thereof, and of a fibrous cord or cords passing through the springs and extending in the form of a continuous openly-wound helix, the cord or cords alone passing across the flat base of the tire and the springs and cord or cords being embedded in the rubber around the bore of the tire at intervals with rubber intervening between the springs, substantially as specified.

4. The combination with a hollow rubber wheel-tire of substantially D section, of helical springs extending in arched form around the outer part of the bore with their ends presented toward the base or flat side thereof, and of separate lengths of fibrous cords passing through the springs and their end portions which project from the ends of the springs extending transversely and meeting at the middle of the base of the tire, the springs and cords being embedded in the rubber around the bore of the tire at intervals with rubber intervening between the springs, substantially as specified.

5. A hollow rubber wheel-tire of substantially D section having embedded therein at intervals, helical springs extending in arched form around the outer part of the bore of the tire with their ends presented toward the base thereof, a fibrous cord or cords passing through the springs and extending across the flat base of the tire, a canvas liner for the bore of the tire united to the cord convolutions and to the intervening rubber, the canvas liner and the rubber to which it is united being molded with grooves extending in the circumferential direction of the bore between adjacent cord convolutions, as specified.

6. The method of making a rubber tire having helical springs and cords passing through the springs, embedded in the rubber around the bore as herein described, which method consists in winding about a mandrel of substantially D section a continuous cord or assemblage of cords having threaded thereon helical springs spaced at intervals apart corresponding to the portions of the cord which pass across the flat side of the mandrel, the cord with the springs threaded thereon being wound in the form of an open helix tightly about the mandrel so as to bind the springs thereto and retain them in the arched form, and then applying rubber between the convolutions and afterward by extrusion through a die about the mandrel, cord, and springs, substantially as specified.

WILLIAM FREDERICK WILLIAMS.

Witnesses:
C. G. CLARK,
T. W. KENNARD.